(12) United States Patent
Zhou (10) Patent No.: US 11,207,908 B2
(45) Date of Patent: Dec. 28, 2021

(54) FABRIC PRINT MEDIUM (71) Applicant: Hewlett-Packard Development Company, L.P., Fort Collins, CO (US)

(72) Inventor: Xiaoqi Zhou, San Diego, CA (US)

(73) Assignee: Hewlett-Packard Development Company, L.P., Spring, TX (US)

(*) Notice: Subject to any disclaimer, the term of this patent is extended or adjusted under 35 U.S.C. 154(b) by 369 days.

(21) Appl. No.: 16/306,914

(22) PCT Filed: Sep. 9, 2016

(86) PCT No.: PCT/US2016/051050
§ 371 (c)(1),
(2) Date: Dec. 4, 2018

(87) PCT Pub. No.: WO2018/048423
PCT Pub. Date: Mar. 15, 2018

(65) Prior Publication Data
US 2020/0024800 A1  Jan. 23, 2020

(51) Int. Cl.
*B41M 5/50* (2006.01)
*B41M 5/52* (2006.01)
*B41M 5/00* (2006.01)

(52) U.S. Cl.
CPC ........... *B41M 5/5263* (2013.01); *B41M 5/00* (2013.01); *B41M 5/506* (2013.01); *B41M 5/508* (2013.01); *B41M 5/52* (2013.01); *B41M 5/5281* (2013.01)

(58) Field of Classification Search
CPC .... B41M 5/5263; B41M 5/506; B41M 5/508; B41M 5/52; B41M 5/5281

USPC ...................................... 428/32.16
See application file for complete search history.

(56) References Cited

U.S. PATENT DOCUMENTS

| | | | |
|---|---|---|---|
| 6,001,137 A | 12/1999 | Alfekri et al. | |
| 6,017,611 A | 1/2000 | Cheng et al. | |
| 6,478,980 B2 | 11/2002 | Nigam | |
| 6,589,633 B1 | 7/2003 | Ino et al. | |
| 6,884,491 B2 | 4/2005 | Rubin et al. | |
| 8,361,573 B2 | 1/2013 | Koenig | |
| 8,512,826 B2 | 8/2013 | Sturme et al. | |

(Continued)

FOREIGN PATENT DOCUMENTS

| | | |
|---|---|---|
| CA | 2528351 | 1/2005 |
| CN | 1240716 | 1/2000 |

(Continued)

OTHER PUBLICATIONS

International Search Report dated Apr. 20, 2017 for PCT/US2016/051050 filed Sep. 9, 2016; Applicant Hewlett-Packard Development Company, L.P.

*Primary Examiner* — Betelhem Shewareged
(74) *Attorney, Agent, or Firm* — HP Inc. Patent Department (57) ABSTRACT

A fabric print medium comprising a fabric base substrate; a primary coating composition with a polymeric binder and filler particles applied to, at least, one side of the fabric base substrate; an image-receiving coating composition with a first and a second crosslinked polymeric network applied over the primary coating composition; and a barrier layer comprising a water-repellent agent and a physical gelling compound. Also disclosed are the method for making such fabric print medium and the method for producing printed images using said material.

22 Claims, 2 Drawing Sheets

(56) References Cited

U.S. PATENT DOCUMENTS

| | | |
|---|---|---|
| 2001/0009712 A1 | 7/2001 | Totani et al. |
| 2003/0157303 A1 | 8/2003 | Li et al. |
| 2004/0202832 A1 | 10/2004 | Nigam et al. |
| 2004/0248492 A1 | 12/2004 | Baker |
| 2005/0145325 A1 | 7/2005 | Kronzer et al. |
| 2005/0233662 A1 | 10/2005 | Kimbrell et al. |
| 2005/0245156 A1 | 11/2005 | Cates et al. |
| 2006/0281849 A1 | 12/2006 | Johnson |
| 2007/0172610 A1 | 7/2007 | Williams |
| 2008/0057232 A1 | 3/2008 | Leon et al. |
| 2009/0178186 A1 | 7/2009 | Truesdale |
| 2009/0208675 A1 | 8/2009 | Nigam |
| 2011/0008542 A1 | 1/2011 | Zeng et al. |
| 2011/0102497 A1 | 5/2011 | Sato et al. |
| 2014/0068877 A1 | 3/2014 | Ellis |
| 2015/0152592 A1 | 6/2015 | Fu et al. |
| 2016/0059606 A1 | 3/2016 | Zhou et al. |
| 2016/0243870 A1 | 8/2016 | Fu et al. |
| 2016/0332471 A1 * | 11/2016 | Zhou, Jr. ............... B41M 5/506 |

FOREIGN PATENT DOCUMENTS

| | | |
|---|---|---|
| CN | 101104351 | 1/2008 |
| CN | 101679821 | 3/2010 |
| CN | 101687425 | 3/2010 |
| CN | 101802891 | 8/2010 |
| CN | 101945937 | 1/2011 |
| CN | 101983132 | 3/2011 |
| CN | 102197085 | 9/2011 |
| CN | 102470667 | 5/2012 |
| CN | 103012941 | 4/2013 |
| CN | 103442898 | 12/2013 |
| CN | 103450544 | 12/2013 |
| CN | 103554595 | 2/2014 |
| CN | 104053553 | 9/2014 |
| CN | 104272501 | 1/2015 |
| CN | 104364086 | 2/2015 |
| CN | 104411749 | 3/2015 |
| CN | 104507700 | 4/2015 |
| CN | 104662228 | 5/2015 |
| CN | 105163947 | 12/2015 |
| CN | 105377569 | 3/2016 |
| CN | 105377570 | 3/2016 |
| CN | 105531121 | 4/2016 |
| CN | 105705339 | 6/2016 |
| CN | 105899651 | 8/2016 |
| EP | 1048479 | 11/2000 |
| EP | 1216839 | 6/2002 |
| JP | H09226229 | 9/1997 |
| JP | 2000203150 | 7/2000 |
| RU | 2110410 | 5/1998 |
| WO | 2010114899 | 10/2010 |
| WO | 2013162578 | 10/2013 |
| WO | 2014014453 | 1/2014 |
| WO | 2014035414 | 3/2014 |
| WO | 2015041666 | 3/2015 |
| WO | 2015108564 | 7/2015 |
| WO | 2015126374 | 8/2015 |
| WO | 2015142313 | 9/2015 |

* cited by examiner

FABRIC PRINT MEDIUM

BACKGROUND

Inkjet printing technology has expanded its application to large format high-speed, commercial and industrial printing, in addition to home and office usage, because of its ability to produce economical, high quality, multi-colored prints. This technology is a non-impact printing method in which an electronic signal controls and directs droplets or a stream of ink that can be deposited on a wide variety of medium substrates. Inkjet printing technology has found various applications on different substrates including, for examples, cellulose paper, metal, plastic, fabric and the like. The substrate plays a key role in the overall image quality and permanence of the printed images.

Textile printing has various applications including the creation of signs, banners, artwork, apparel, wall coverings, window coverings, upholstery, pillows, blankets, flags, tote bags, etc. It is a growing and evolving area and is becoming a trend in the visual communication market. As the area of textile printing continues to grow and evolve, the demand for new print medium increases.

BRIEF DESCRIPTION OF THE DRAWING

The drawings illustrate various examples of the present print medium and are part of the specification.

DETAILED DESCRIPTION

Before particular examples of the present disclosure are disclosed and described, it is to be understood that the present disclosure is not limited to the particular process and materials disclosed herein. It is also to be understood that the terminology used herein is used for describing particular examples only and is not intended to be limiting, as the scope of protection will be defined by the claims and equivalents thereof. In describing and claiming the present article and method, the following terminology will be used: the singular forms "a", "an", and "the" include plural referents unless the context clearly dictates otherwise. Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For examples, a weight range of about 1 wt % to about 20 wt % should be interpreted to include not only the explicitly recited concentration limits of 1 wt % to 20 wt %, but also to include individual concentrations such as 2 wt %, 3 wt %, 4 wt %, and sub-ranges such as 5 wt % to 15 wt %, 10 wt % to 20 wt %, etc. All percentages are by weight (wt %) unless otherwise indicated. As used herein, "image" refers to marks, signs, symbols, figures, indications, and/or appearances deposited upon a material or substrate with either visible or an invisible ink composition. Examples of an image can include characters, words, numbers, alphanumeric symbols, punctuation, text, lines, underlines, highlights, and the like.

When printing on fabric substrates, challenges exist due to the specific nature of fabric. Indeed, often, fabric does not accurately receive inks. Some fabrics, for instance, can be highly absorptive, diminishing color characteristics, while some synthetic fabrics can be crystalline, decreasing aqueous ink absorption leading to ink bleed. These characteristics result in the image quality on fabric being relatively low. Additionally, black optical density, color gamut, and sharpness of the printed images are often poor compared to images printed on cellulose paper or other media types. Durability, such as rubbing resistance, is another concern when printing on fabric, particularly when pigmented inks and ink compositions containing latex are used. Furthermore, when fabric is intended to be used in close proximity to indoor environments (as drapes, as overhead signage, as part of furnishings, or the like), there are concerns about flame resistance as well as about using coatings that increase the flammability of the fabric. Thus, fire/flame resistance or inhibition characteristics are also desirable when providing printable fabrics. Further, the softness of the fabric printing media, also called "hands feeling", is an important and desirable feature. Treatments to the fabric base, such as coating, is often used in order to make the media stiffer which can results easily wrinkling and white line when material is folded or bended. In addition, from a manufacturer view-points, due the physical structure of fabric substrate (i.e. with high area open holes), the solvent loss of coating composition, as called "de-watering effect", often rises some challenges over other non-porous substrate like plastic film. The fabric print medium as described herein is able to solve all these desirable features. The present disclosure is directed to a fabric print medium that meet, to some extent, the features described above.

In some examples, the present disclosure is drawn to a fabric print medium comprising a fabric base substrate; a barrier layer comprising a water-repellent agent and a physical gelling compound applied to at least one side of the fabric base substrate; a primary coating composition including a polymeric binder and filler particles, applied over the barrier layer and an image-receiving coating composition including a first and a second crosslinked polymeric network applied over the primary coating composition. The present disclosure also relates to a method for forming said fabric print medium and to the printing method using said fabric print medium.

In some other examples, the present disclosure is drawn to a printable recording medium comprising a fabric base substrate; a barrier layer with a film-forming polymer latex having a glass transition temperature (Tg) that is less than 0° C. and a physical gelling compound applied to, at least, one side of the fabric base substrate; a primary coating composition including a polymeric binder and filler particles, applied over the barrier layer; and an image-receiving coating composition.

The image printed on the fabric print medium of the present disclosure exhibits excellent printing qualities, durability and softness. By using coating compositions, in combination with fabric substrate, the printing process is more accurate and the printed image is more permanent. The resultant printed fabric will also be able to provide fire/flame resistance or inhibition to the fabric. The present disclosure refers to a fabric print medium comprising a fabric base substrate and coating compositions applied to said fabric base substrate. The coating compositions, also called treatment compositions, once applied on the fabric base substrate, form a thin layer onto the fabric base surface.

Figure 1:
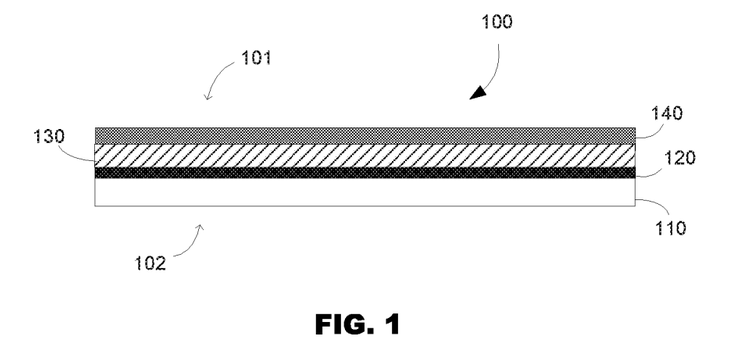
FIGS. 1 and 2 are cross-sectional views of the fabric print medium according to examples of the present disclosure.
Figure 2:
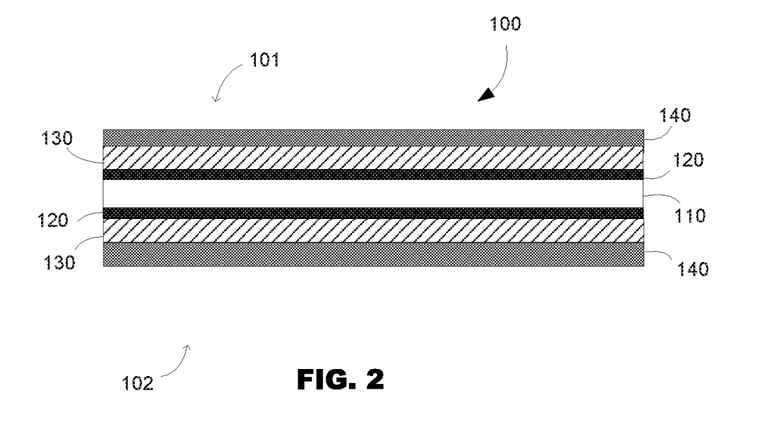

FIG. 1 and FIG. 2 illustrate the fabric print medium (100) as described herein. The fabric print medium (100) has two sides (101) and (102) and comprise a fabric base substrate (110), a barrier layer (120), a first coating composition or primary coating composition (130), and a second coating composition or image-receiving layer (140).

As illustrated in FIG. 1, the fabric print medium (100) encompasses a fabric base substrate (110) with a barrier layer (120) that is applied on the same side where the primary coating composition (130) and the image-receiving layer (140) are deposited. The barrier layer (120), the primary coating composition (130) and the image-receiving layer (140) are all applied to the image side (101) of the fabric print medium. If said coated side is used as an image-receiving side, the other side, i.e. backside, may not have any coating at all, or may be coated with other chemicals (e.g. sizing agents and backing adhesives) or coatings, or laminate with other materials such as backing paper and plastic film/sheet to meet certain features such as to balance the curl of the final product or to improve printing performance.

In some other examples, such as illustrated in FIG. 2, the barrier layer (120), the primary coating composition (130) and the image-receiving layer (140) are applied to both opposing sides of the supporting fabric base substrate (110). The double-side coated media has thus a sandwich structure, i.e. both sides of the fabric base substrate (110) are coated and both sides may be printed. The chemical composition of each coating layer (the barrier layer (120), the primary coating composition (130) and the image-receiving layer (140)) can be identical or different.

Figure 3:
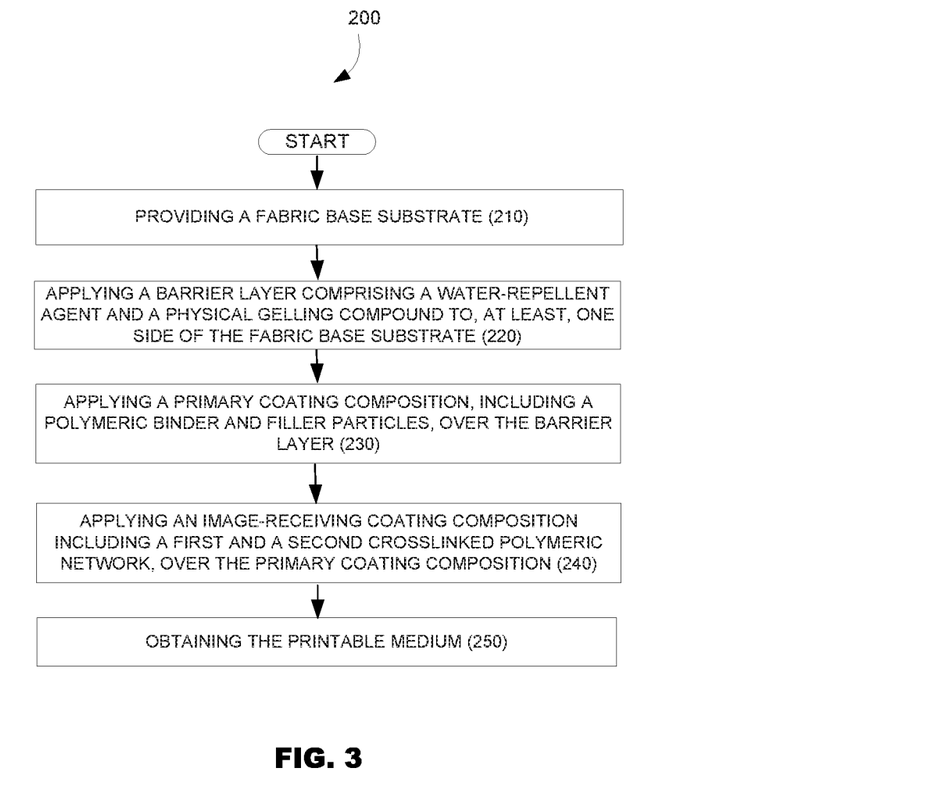
FIG. 3 is a flowchart illustrating a method for producing the fabric print medium according to some examples of the present disclosure.

An example of a method for forming a fabric print medium (200) in accordance with the principles described herein, by way of illustration and not limitation, is shown in FIG. 3. Such method encompasses providing (210) a fabric base substrate (110); applying (220) a barrier layer comprising a water-repellent agent and a physical gelling compound to, at least, one side of the fabric base substrate (120); applying (230) a primary coating composition, including a polymeric binder and filler particles, over the barrier layer (120); and applying an image-receiving coating composition including a first and a second crosslinked polymeric network, over the primary coating composition (240).

Figure 4:
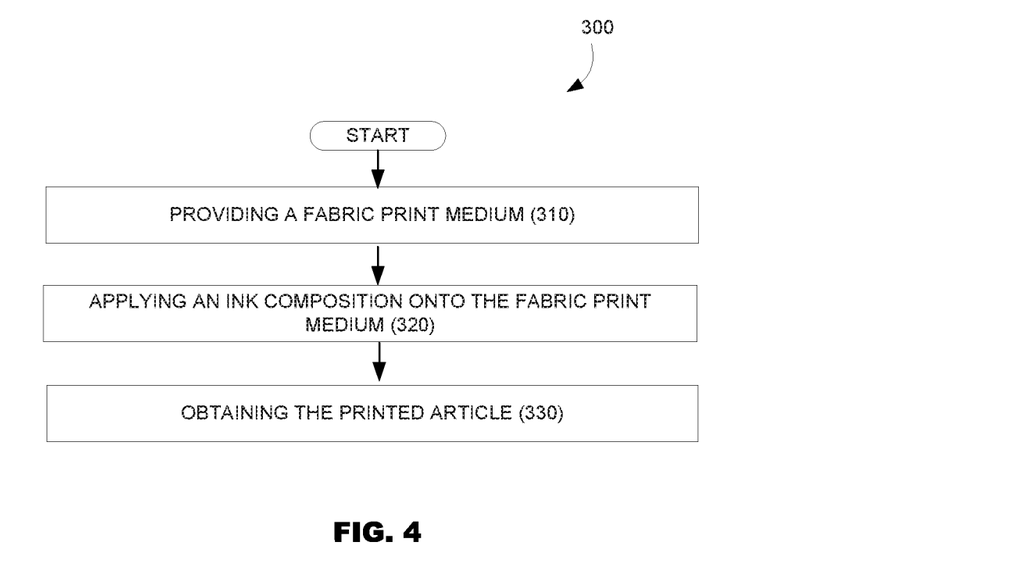
FIG. 4 is a flowchart illustrating a method for producing printed images according to some examples of the present disclosure.

An example of a printing method in accordance with the principles described herein, by way of illustration and not limitation, is shown in FIG. 4. FIG. 4 illustrates examples of the printing method (300) that encompasses providing a fabric print medium (310), applying an ink composition onto said a print medium (320) and obtaining a printed article (330).

The barrier layer (120) can be applied to the fabric base substrate (110) at a variety of coat weights. In one example, the barrier layer (120) can be applied to the fabric base substrate at a dry coat weight ranging from about 0.5 gram per square meter (g/m² or gsm) per side to about 10 gram per square meter (g/m² or gsm) per side. In another example, the barrier layer (120) can be applied, to the fabric substrate, at a dry coat weight ranging from about 0.8 gram per square meter (g/m² or gsm) per side to about 5 gram per square meter (g/m² or gsm) per side. In yet another example, the barrier layer (120) can be applied, to the fabric substrate, at a coating weight ranging from about 1 gsm to about 3 gsm. The barrier layer (120) can be applied to the first side (101), to the second side (102), or to both sides (101) and (102) of the fabric base substrate (110).

The primary coating composition can be applied over the barrier layer (120) at a variety of coat weights, to one side or to both sides of the media. The primary coating composition (130) is applied over the barrier layer at a dry coat weight ranging from about 5 gram per square meter (g/m² or gsm) per side to about 200 gram per square meter (g/m² or gsm) per side, or at a dry coat weight ranging from about 10 gram per square meter (g/m² or gsm) per side to about 150 gram per square meter (g/m² or gsm) per side, or at a coating weight ranging from about 15 gsm to about 50 gsm. The second coating composition or image-receiving layer (140) can be applied, over the primary coating composition (130), to one side or to both sides of the media. The image-receiving layer (140) can be applied, over the primary coating composition (130), at a dry coat weight ranging from about 0.5 gram per square meter (g/m² or gsm) per side to about 50 gram per square meter (g/m² or gsm) per side. The secondary coating layer can be applied to the primary coating composition at a thickness ranging from about 1 μm to about 50 μm.

The Fabric Base Substrate (110)

A fabric print medium (100) of the present disclosure, that can also be called herein printable recording media, is a fabric media that comprises a fabric base substrate (110). The fabric base substrate (110) can also be called bottom supporting substrate or fabric supporting substrate. The word "supporting" also refers to a physical objective of the substrate that is to carry the coatings layer and the image that is going to be printed.

Regarding such fabric base substrate, any textile, fabric material, fabric clothing, or other fabric product where there is a desire for application of printed matter can benefit from the principles described herein. More specifically, fabric substrates useful in present disclosure include substrates that have fibers that may be natural and/or synthetic. The term "fabric" as used to mean a textile, a cloth, a fabric material, fabric clothing, or another fabric product. The term "fabric structure" is intended to mean a structure having warp and weft that is one of woven, non-woven, knitted, tufted, crocheted, knotted, and pressured, for example. The terms "warp" and "weft" refers to weaving terms that have their ordinary means in the textile arts, as used herein, e.g., warp refers to lengthwise or longitudinal yarns on a loom, while weft refers to crosswise or transverse yarns on a loom.

It is notable that the term "fabric substrate" does not include materials commonly known as any kind of paper (even though paper can include multiple types of natural and synthetic fibers or mixture of both types of fibers). The paper thereon is defined as the felted sheet, roll and other physical forms that are made of various plant fibers (like trees or mixture of plant fibers) with synthetic fibers by laid down on a fine screen from a water suspension. Furthermore, fabric substrates include both textiles in its filament form, in the form of fabric material, or even in the form of fabric that has been crafted into finished article (clothing, blankets, tablecloths, napkins, bedding material, curtains, carpet, shoes, etc.). In some examples, the fabric base substrate has a woven, knitted, non-woven or tufted fabric structure.

In some examples, the fabric base substrate comprises wool, cotton, silk, linen, jute, flax, hemp, rayon, corn starch, tapioca, sugarcane, polyvinyl chloride, polyester, polyamide, polyimide, polyacrylic, polyacrylic polypropylene, polyethylene, polyurethane, polystyrene, polyaramid, polytetrafluoroethylene, polyethylene terephthalate, fiberglass, polytrimethylene, polycarbonate, polyester terephthalate, polybutylene terephthalate, or a combination thereof. In some other examples, the fabric base substrate is woven, knitted, non-woven or tufted and comprises natural or synthetic fibers selected from the group consisting of wool, cotton, silk, rayon, thermoplastic aliphatic polymers, polyesters, polyamides, polyimides, polypropylene, polyethylene, polystyrene, polytetrafluoroethylene, fiberglass, polycarbonates polytrimethylene terephthalate, polyethylene terephthalate and polybutylene terephthalate. In yet some other examples, the fabric base substrate is a synthetic polyester fiber.

In some examples, the fabric base substrate (110) has a basis weight that is ranging from about 50 gsm to about 400 gsm. In some other examples, the basis weight of the fabric substrate can range from about 100 gsm to about 300 gsm.

The fabric base substrate can be a woven fabric where warp yarns and weft yarns are mutually positioned at an angle of about 90°. This woven fabric includes, but is not limited to, fabric with a plain weave structure, fabric with twill weave structure where the twill weave produces diagonal lines on a face of the fabric, or a satin weave. The fabric base substrate can be a knitted fabric with a loop structure including one or both of warp-knit fabric and weft-knit fabric. The weft-knit fabric refers to loops of one row of fabric are formed from the same yarn. The warp-knit fabric refers to every loop in the fabric structure that is formed from a separate yarn mainly introduced in a longitudinal fabric direction. The fabric base substrate can also be a non-woven product, for example a flexible fabric that includes a plurality of fibers or filaments that are one or both of bonded together and interlocked together by a chemical treatment process (e.g., a solvent treatment), a mechanical treatment process (e.g., embossing), a thermal treatment process, or a combination of two or more of these processes.

The fabric base substrate can include one or both of natural fibers and synthetic fibers. Natural fibers that may be used include, but are not limited to, wool, cotton, silk, linen, jute, flax or hemp. Additional fibers that may be used include, but are not limited to, rayon fibers, or those of thermoplastic aliphatic polymeric fibers derived from renewable resources, including, but not limited to, cornstarch, tapioca products, or sugarcanes. These additional fibers can be referred to as "natural" fibers. In some examples, the fibers used in the fabric base substrate includes a combination of two or more from the above-listed natural fibers, a combination of any of the above-listed natural fibers with another natural fiber or with synthetic fiber, a mixture of two or more from the above-listed natural fibers, or a mixture of any thereof with another natural fiber or with synthetic fiber.

The synthetic fiber that may be used in the fabric base substrate can be a polymeric fiber including, but not limited to, polyvinyl chloride (PVC) fibers, PVC-free fibers made of polyester, polyamide, polyimide, polyacrylic, polypropylene, polyethylene, polyurethane, polystyrene, polyaramid (e.g., Kevlar®) polytetrafluoroethylene (Teflon®) (both trademarks of E. I. du Pont de Nemours Company), fiberglass, polytrimethylene, polycarbonate, polyethylene terephthalate or polybutylene terephthalate. In some examples, the fibers include a combination of two or more of the above-listed polymeric fibers, a combination of any of the above-listed polymeric fibers with another polymeric fiber or with natural fiber, a mixture of two or more of the above-listed polymeric fibers, or a mixture of any of the above-listed polymeric fibers with another polymer fiber or with natural fiber. In some examples, the synthetic fiber includes modified fibers from above-listed polymers. The term "modified fibers" refers to one or both of the polymeric fiber and the fabric as a whole having underwent a chemical or physical process such as, but not limited to, one or more of a copolymerization with monomers of other polymers, a chemical grafting reaction to contact a chemical functional group with one or both the polymeric fiber and a surface of the fabric, a plasma treatment, a solvent treatment, for example acid etching, and a biological treatment, for example an enzyme treatment or antimicrobial treatment to prevent biological degradation. The term "PVC-free" means no polyvinyl chloride (PVC) polymer or vinyl chloride monomer units in the substrate.

In some examples, the fabric base substrate contains both natural fiber and synthetic polymeric fiber. The amount of synthetic polymeric fibers can represent from about 20% to about 90% of the total amount of fiber. The amount of natural fibers can represent from about 10% to about 80% of amount of fiber.

The fabric base substrate may further contains additives including, but not limited to, one or more of colorant (e.g., pigments, dyes, tints), antistatic agents, brightening agents, nucleating agents, antioxidants, UV stabilizers, fillers and lubricants, for example. Alternatively, the fabric base substrate may be pre-treated in a solution containing the substances listed above before applying the coating composition. The additives and pre-treatments are included in order to improve various properties of the fabric.

The Barrier Layer Composition (120)

The fabric print medium of the present disclosure comprises a fabric base substrate (110); a barrier layer (120); a primary coating composition (130) and an image-receiving coating composition (140). The barrier layer (120) can be applied on the fabric base substrate, either on the image side (101) of the fabric print medium, or, on both sides (i.e. the image side (101) and the non-imaging side (102)) of the fabric print medium.

The barrier layer (120) can be applied to the fabric base substrate (110) at a dry coat weight ranging from about 0.5 to about 10 gsm per side or can be applied to the fabric base substrate at a dry coat weight ranging from about 1 to about 3 gsm per side. The barrier layer (120) can be applied to the fabric base substrate (110) at a thickness ranging from about 0.4 μm to about 9 μm.

When present on the fabric print medium, the barrier layer composition acts as a barrier for aqueous liquid such as water, i.e. avoid the penetration of the aqueous liquid into the fabric base substrate. Without being bounded by any theory, it is believed that the barrier layer helps to prevent the primary coating composition to penetrate through the open holes and contaminate thus the backside of the fabric substrate. Indeed, when such media are made in large production scale (with roll format), backside contaminants could transfer onto the front side, and might destroy the coating quality. In addition, it is believed that the presence of the barrier layer will prevent the "de-watering" effect that could happen during manufacture. Indeed, when printing of fabric substrate, due to the "open structure" of fabric substrate, solvent or water from coating compositions can be lost by penetrating through the fabric base when apply coatings. Such a "de-watering" effect could become worse when applying an image-receiving coating on top of the primary coating since capillary effects from microporous structure of the primary coating intensified the effect. Such "de-watering" effect could also rise the coating composition viscosity which make very poor coating quality and which could also damage the coater.

The barrier layer composition is made of a chemical fluid that has a thixotropic behavior. The thixotropic behavior refers to fluids that are non-Newtonian fluids, i.e. which are able to show a time-dependent change in viscosity. The term "non-Newtonian" refers herein to fluid having a viscosity that is dependent on applied forces such as shear or thermal forces. For example, shear thinning fluids decrease in viscosity with increasing rate of shear. The greater chemical fluid of the water barrier layer undergoes shear stress, the lower its viscosity will be. When the share stress is removed, the viscosity can be re-built up. Not binding to any theory, it is believe, that such thixotropic behavior reduces the penetration of the barrier layer composition into the fabric substrate and helps to retain the composition at the top surface of the substrate. The fluid becomes thin under shear force when applied by a coating application head (such as a blade coating head); when the fluid is deposited (the nip of the blade and shear force are removed), the viscosity of fluid is built-up and the fluid remains at top surface of the fabric substrate.

Thus, in order to have such thixotropic behavior, the water barrier layer comprises water-repellent agent, i.e. a chemical compound which is able reduce water penetration speed, and a physical gelling compound, i.e. a compound which is able to make physical network, as also called physical gelling, when reacting with the water-repellent chemical.

In some examples, the chemical fluid, or composition, which has a thixotropic behavior and which forms the barrier layer, comprises a mixture of water-repellent agent and physical gelling compound and is a solution having a pH, which is adjusted in the range of about 8 to 10.

The barrier layer of the fabric print medium comprises a water-repellent agent and a physical gelling compound. Any chemical compounds having water-repellency properties could be used as a water-repellent agent in the barrier layer of the media. As water-repellent property, it is meant herein that a layer formed with such compound will reduce the penetration speed of liquids (such as water).

In some examples, the water-repellent agent is a film-forming polymer latex having a glass transition temperature (Tg) that is less than 0° C. In some other examples, the water-repellent agents are soft film-forming polymer latex, which have a good adhesion with primary coating composition. Polymer latex refers to polymer dispersions that are made by emulsion polymerization. Such polymer latex are present, in aqueous solvent, in a form of particles. Film-forming polymer latex are defined herein as being able to form a continuous film upon the "coalescence" (i.e. compaction, deformation, cohesion and polymer chain inter-diffusion) of the polymer latex particles.

The water-repellent agent is a polymeric high molecular weight water-repellent agent (i.e. latex polymer water-repellent agent or water-repellent polymer or water-repellent resin) that will a form a continuous film at processing temperature. As film-forming, it is meant herein that the polymeric compound, once the solvent or dispersing phase is removed, will form a continuous thin film in order to form a physical layer to block, or at least reduced the penetration speed of aqueous solvent (such as water) along the z-direction of the coating containing it and, therefore, reduced the penetration speed of the aqueous solvent (such as water) along z-direction of fabric substrate.

In some examples, the water-repellent agents are capable to form a latex film that would be able to control the surface energy ($\gamma$) of the fabric substrate to a level ranging between about 30 mN/m to about 55 mN/m, when measured at 25° C. In some other examples, the water-repellent agents are capable to form a latex film that would be able to control the surface energy ($\gamma$) of the fabric substrate to a level above about 40 mN/m, or above about 55 mN/m. The surface energy ($\gamma$) is expressed in mN/m and can be measure by a Force Tensiometer (such as K11, as supplied by Kruss, USA). The surface energy ($\gamma$) is a parameter that ensure good adhesion between barrier layer and primer coating.

In some examples, the water-repellent agent is a latex polymer having a glass transition temperature (Tg) that is less than 0° C. Such polymer latex is a high molecular weight polymeric film-forming compound, also called latex polymer, which can be hydrophobic or hydrophilic. In some other examples, the latex polymer water-repellent agent is a polyacrylic latex polymer.

The latex polymer water-repellent agent is a film-forming polymeric compound, which can be hydrophobic or hydrophilic, and which has a glass transition temperature (Tg) that is less than 0° C. Indeed, it is believed that polymer with higher glass transition temperature (Tg) might contribute to a rigid coating and can damage the fabric "hand feeling" of the printing media. In some examples, the water-repellent polymer has a glass transition temperature (Tg) that is less than 0° C. In some other examples, the water-repellent polymer has a glass transition temperature (Tg) that is less than −5° C. In yet some other examples, the water-repellent polymer has a glass transition temperature (Tg) that is less than −10° C. The way of measuring the glass transition temperature (Tg) parameter is described in, for example, Polymer Handbook, 3rd Edition, authored by J. Brandrup, edited by E. H. Immergut, Wiley-Interscience, 1989. In some examples, the water-repellent agent is a polyacrylic latex polymer having a glass transition temperature (Tg) that is less than 0° C.

Without being linked by any theory, it is believed that the formation of a continuous film is dependent on the minimum film formation temperature (MFFT) of the polymer, which in turn is dependent on the elastic modulus resistance to particle deformation. The MFFT, is close to the glass transition temperature (Tg) of a given polymer, and a lower Tg is an indicator of softer polymer film, which contribute remarkably to the soft hands of the printing media. Therefore, a low Tg polymer will benefit both film-form and low stiffness of the final media.

The water-repellent agent includes resins or latex binders formed by polymerization of hydrophobic addition monomers. Examples of hydrophobic addition monomers include, but are not limited to, $C_1$-$C_{12}$ alkyl acrylate and methacrylate (e.g., methyl acrylate, ethyl acrylate, n-propyl acrylate, isopropyl acrylate, n-butyl acrylate, isobutyl acrylate, sec-butyl acrylate, tert-butyl acrylate, 2-ethylhexyl acrylate, octyl acrylate, methyl methacrylate, ethyl methacrylate, n-propyl methacrylate, isopropyl methacrylate, n-butyl methacrylate, isobutyl methacrylate, sec-butyl methacrylate, tert-butyl methacrylate), aromatic monomers (e.g., styrene, phenyl methacrylate, o-tolyl methacrylate, m-tolyl methacrylate, p-tolyl methacrylate, benzyl methacrylate), hydroxyl containing monomers (e.g., hydroxyethylacrylate, hydroxyethylmthacrylate), carboxylic acid containing monomers (e.g., acrylic acid, methacrylic acid), vinyl ester monomers (e.g., vinyl acetate, vinyl propionate, vinyl benzoate, vinyl pivalate, vinyl-2-ethylhexanoate, vinyl versatate), vinyl benzene monomer, C1-C12 alkyl acrylamide and methacrylamide (e.g., t-butyl acrylamide, sec-butyl acrylamide, N,N-dimethylacrylamide), crosslinking monomers (e.g., divinyl benzene, ethylene glycol dimethacrylate, bis(acryloylamido)methylene), and combinations thereof. Polymers made from one or both of the polymerization and copolymerization of alkyl acrylate, alkyl methacrylate, vinyl esters, and styrene derivatives also may be used.

Non-limitative examples of suitable water-repellent polymers include styrene butadiene copolymer, polyacrylates, polyvinylacetates, polyacrylic acids, polyesters, polyvinyl alcohol, polystyrene, polymethacrylates, polyacrylic esters, polymethacrylic esters, polyurethanes, copolymers thereof, and combinations thereof.

In some examples, the water-repellent agent is an acrylic polymer or copolymer, a vinyl acetate polymer or copolymer, a polyester polymer or copolymer, a vinylidene chloride polymer or copolymer, a butadiene polymer or copolymer, a styrene-butadiene polymer or copolymer, an acrylonitrile-butadiene polymers or copolymers. The water-repellent agent can thus be selected from the group consisting of acrylic polymers or copolymers, vinyl acetate polymers or copolymers, polyester polymers or copolymers, vinylidene chloride polymers or copolymers, butadiene polymers or copolymers, styrene-butadiene polymers or copolymers, acrylonitrile-butadiene polymers or copolymers. In some examples, the water-repellent polymer is a latex containing compound of a vinyl acetate-based polymer, an acrylic polymer, a styrene polymer, an SBR-based polymer, a polyester-based polymer, a vinyl chloride-based polymer, or the like. In some other examples, the water-repellent agent is selected from the group consisting of acrylic polymers, vinyl-acrylic copolymers and acrylic-polyurethane copolymers. In yet some other examples, the water-repellent polymer is a styrene-butadiene copolymer.

Representative examples of commercially available water-repellent agents include, but are not limited to, Suncryl®CP-50, Acrygen® 61192, Acrygen® 1970D, Acrygen® 4096D available from Omnova Co, or SC6531, SC 6537, SC6134 and SC6495 available from Stan Chem Inc. or also Rovene®4040 available from Mallard Creek Polymers.

When the barrier layer contains a water-repellent agent that is a polyacrylic latex polymer having a glass transition temperature (Tg) that is less than 0° C., the barrier layer is built up on same side where the primary coating composition and image-receiving coating composition are deposited. In some examples, when the barrier layer comprises a water-repellent agent that is a latex polymer having a glass transition temperature (Tg) that is less than 0° C., the water barrier layer comprising it will be built up on the image-receiving side of the fabric print medium. The fabric print medium that comprises a barrier layer with water-repellent agents which are latex polymer having a glass transition temperature (Tg) that is less than 0° C. will be applied over the fabric base substrate and the primary coating composition will be applied over said barrier layer.

The barrier layer comprise a water-repellent agent and a physical gelling compound. The physical gelling compound is capable to make a physical network with the water-repellent agent. The physical gelling compound will be able to generate various physical force, or physical bonding, with the water-repellent agent in order to form a gel-like solution. By "gel-like solution", it is meant herein a solution system that has a low solids content, (i.e. from about 5 to about 30 wt %) but very high viscosity (i.e. above 15,000 cps at 30 rpm as measured by a Brookfield viscometer, when measured at 25° C.), at low share stress and that will behave like a non-flowable semi-solids gel. This "gel-like solution" will be able to "de-bonding" at higher share force and yield a low viscosity fluid refereed as thixotropic behavior described previously.

The physical gelling compounds are high molecular weight polymers, i.e. having a molecular weight ranging from about 300,000 to about 1,000,000. The physical gelling compounds can be copolymers of acrylates, copolymers with acrylate based polyelectrolyte backbone, copolymers with polyester backbone, or copolymers with polyurethane based copolymer backbone. In some examples, the physical gelling compound is selected from the group consisting of copolymers of acrylates, copolymers with acrylate based polyelectrolyte backbone, copolymers with polyester backbone, and copolymers with polyurethane based copolymer backbone.

In some examples, the physical gelling compounds, which are part of the barrier layer, are high molecular weight copolymers of acrylates (i.e. having a molecular weight ranging from about 300,000 to about 1,000,000) such as copolymer of methacrylic acid and ethyl acrylate ester. Examples of such compounds include Acusol®810A, Acusol L®830, Acusol®835, ACUSOL® 842 (supplied by Rohm Haas/Dow Co); or Alcogum® L11, Alcogum® L12, Alcogum® L51, Alcogum® L31 and Alcogum® L52 (available from Akzo Nobel Co). In some other examples, the physical gelling compounds of the barrier layer are high molecular weight copolymers with acrylate based polyelectrolyte backbone. Such high molecular weight copolymers with acrylate based polyelectrolyte backbone can be, for examples, acrylate acid copolymers, grafted pendant with long-chain hydrophobic groups in addition to acid groups in backbone distributed throughout the polymer chain. Examples of such polymers that are commercially available include Texicryl®13-317, Texicryl®13-313, Texicryl®13-308, and Texicryl® 13-312 (all available from Scott Bader Group). In yet some other examples, the physical gelling compounds of the barrier layer, are high molecular weight copolymers with polyester backbone. Such high molecular weight copolymers with polyester backbone can be, for examples, polyethylene glycol copolymers, grafted pendant with long-chain hydrophobic groups in addition to polar groups in backbone distributed throughout the polymer chain. Examples of such polymers that are commercially available include Rheovis® PE from BASF. In further examples, the physical gelling compounds of the barrier layer are high molecular weight copolymers with polyurethane based copolymer backbone. Such high molecular weight copolymers with polyurethane based copolymer backbone can be, for examples, as polyethylene glycol and isophorone diisocyanate, which can be end-capped with long-chain alkanol in addition to backbone distributed throughout the polymer chain. Examples of such polymers that are commercially available include Acusol®880, Acusol®882 (from Rohm Haas).

The Primary Coating Composition (130)

The fabric print medium of the present disclosure comprises a fabric base substrate (110), a barrier layer (120) comprising a water-repellent agent and a physical gelling compound, a primary coating composition (130) and an image-receiving coating composition (140). The primer or primary coating composition (130), is applied to, at least one side of the fabric base substrate (110), and is based on a treatment composition that includes at least a polymeric binder and filler particles.

The primary coating composition (130) can be directly applied on the fabric substrate (110) on the image side (101) of the media; the other side, or backside (102), will then be coated with the barrier layer (120). The primary coating composition (130) can also be applied over the barrier layer (120), to the first side (101), to the second side (102), or to both sides (101) and (102) of the media if both sides of the media are coated with the barrier layer (120).

In some examples, the primary coating composition (130) is applied over the barrier layer (120) when the barrier layer is applied over the fabric base substrate and comprises water-repellent agent which is latex polymer having a glass transition temperature (Tg) that is less than 0° C. In some other examples, the primary coating composition (130) is applied on the fabric base substrate on the opposite side of the barrier layer (120) when the barrier layer is applied over the fabric base substrate and comprises water-repellent agent, which is a compound with long paraffin chains.

The primary coating composition or primary coating composition includes a polymeric binder and filler particles applied. The primary coating composition can also include a flame retardant agent or filler particles with flame retardancy properties. Other functional additives can be added to the primary coating composition, for specific property control such as, for examples, optical brightener agent, optical brightener agent carrier, dyes for color hue, surfactant for wettability, and processing control agent such as deformer, and PH control base/acid buffer.

The primary coating composition (130) contains a polymeric binder. Without being linked by any theory, it is believed that the polymeric binder can provide binding function to the fillers to form a continuous layer and adhesion function between coating layers and the fabric substrate. In other examples, the polymeric binder can provide blocking functions to prevent the printing ink from penetrating into the z-direction of the fabric substrate so that a high ink volume in kept on the surface of printing media to ensure a vivid image. The polymeric binder can be present, in the primary coating composition, in an amount ranging from about 10 wt % to about 95 wt % by total weigh of the primary coating composition. In one example, the polymeric binder can range from about 45 wt % to about 94 wt % of the primary coating composition. In another example, the polymeric binder can range from about 10 wt % to about 80 wt % of the primary coating composition. In yet another example, the polymeric binder can range from about 20 wt % to about 88 wt % of the primary coating composition.

The polymeric binder can be either water a soluble, a synthetic or a natural substances or an aqueous dispersible substance like polymeric latex. In some other examples, the polymeric binder is polymeric latex. The polymeric binder can be a water soluble polymer or water dispersible polymeric latex. In some examples, the polymeric binder has a glass transition temperature (Tg) that is less than 5° C. Indeed, it is believed that polymeric binder with higher glass transition temperature (Tg) might contribute to a stiff coating and can damage the fabric "hand feeling" of the printing media. In some examples, the polymeric binders have a glass transition temperature (Tg) ranging from −40° C. to 0° C. In some other examples, the polymeric binders have a glass transition temperature (Tg) ranging from −20° C. to −5° C. The way of measuring the glass transition temperature (Tg) parameter is described in, for example, Polymer Handbook, 3rd Edition, authored by J. Brandrup, edited by E. H. Immergut, Wiley-Interscience, 1989.

In some examples, the polymeric binders are crossed-linked binder. "Crossed-linked binder" refers to the fact that multiple polymer substances with reactive function groups can react with each other to form a between-molecular chain structure, a cross linker, a macro-molecular substance or a low molecular weight chemical with more than two function groups that can be used. Binders with "self-crosslink" capability can mean that macro-molecular chains have different reactive function groups that can be used. The cross-linked binders can balance both softness and mechanical strength of the coating layers.

Suitable polymeric binders include, but are not limited to, water soluble polymers such as polyvinyl alcohol, starch derivatives, gelatin, cellulose derivatives, acrylamide polymers, and water dispersible polymers such as acrylic polymers or copolymers, vinyl acetate latex, polyesters, vinylidene chloride latex, styrene-butadiene or acrylonitrile-butadiene copolymers. Non-limitative examples of suitable binders include styrene butadiene copolymer, polyacrylates, polyvinylacetates, polyacrylic acids, polyesters, polyvinyl alcohol, polystyrene, polymethacrylates, polyacrylic esters, polymethacrylic esters, polyurethanes, copolymers thereof, and combinations thereof. In some examples, the binder is a polymer or a copolymer selected from the group consisting of acrylic polymers or copolymers, vinyl acetate polymers or copolymers, polyester polymers or copolymers, vinylidene chloride polymers or copolymers, butadiene polymers or copolymers, styrene-butadiene polymers or copolymers and acrylonitrile-butadiene polymers or copolymers. In a further example, the polymeric binder can include an acrylonitrile-butadiene latex.

In some other examples, the binder component is a latex containing particles of a vinyl acetate-based polymer, an acrylic polymer, a styrene polymer, an SBR-based polymer, a polyester-based polymer, a vinyl chloride-based polymer, or the like. In yet some other examples, the binder is a polymer or a copolymer selected from the group consisting of acrylic polymers, vinyl-acrylic copolymers and acrylic-polyurethane copolymers. Such binders can be polyvinylalcohol or copolymer of vinylpyrrolidone. The copolymer of vinylpyrrolidone can include various other copolymerized monomers, such as methyl acrylates, methyl methacrylate, ethyl acrylate, hydroxyethyl acrylate, hydroxyethyl methacrylate, ethylene, vinylacetates, vinylimidazole, vinylpyridine, vinylcaprolactams, methyl vinylether, maleic anhydride, vinylamides, vinylchloride, vinylidene chloride, dimethylaminoethyl methacrylate, acrylamide, methacrylamide, acrylonitrile, styrene, acrylic acid, sodium vinylsulfonate, vinylpropionate, and methyl vinylketone, etc. Examples of binders include, but are not limited to, polyvinyl alcohols and water-soluble copolymers thereof, e.g., copolymers of polyvinyl alcohol and poly(ethylene oxide) or copolymers of polyvinyl alcohol and polyvinylamine; cationic polyvinyl alcohols; aceto-acetylated polyvinyl alcohols; polyvinyl acetates; polyvinyl pyrrolidones including copolymers of polyvinyl pyrrolidone and polyvinyl acetate; gelatin; silyl-modified polyvinyl alcohol; styrene-butadiene copolymer; acrylic polymer latexes; ethylene-vinyl acetate copolymers; polyurethane resin; polyester resin; and combination thereof.

In one example, the polymeric binder may have an average molecular weight (Mw) of about 5,000 to about 200,000. In another example, the average molecular weight of the polymeric binder can vary from 10,000 Mw to about 200,000 Mw. In yet another example, the average molecular weight of the polymeric binder can vary from 20,000 Mw to 100,000 Mw. In a further example, the average molecular weight of the polymeric binder can vary from 100,000 Mw to 200,000 Mw. In one example, the polymeric binder can have a weight average molecular weight from 5,000 Mw to 200,000 Mw and can include polystyrene-butadiene emulsion, acrylonitrile butadiene latex, starch, gelatin, casein, soy protein polymer, carboxy-methyl cellulose, hydroxyethyl cellulose, acrylic emulsion, vinyl acetate emulsion, vinylidene chloride emulsion, polyester emulsion, polyvinyl pyrroilidene, polyvinyl alcohol, styrene butadiene emulsions, or combination thereof.

In some examples, the polymeric binder is a self-crosslinking aqueous acrylic dispersion such an Edolan® AB available from Tanatex Chemicals (having a solids content of 45% and Tg of −18° C.).

The primary coating composition (130) contains a polymeric binder and filler particles. The filler particles can include inorganic powder, inorganic mineral powder, organic powder and mixture of the both. In some examples, the fillers are particles that can include calcium carbonate, kaolin, talc, calcium sulfate, barium sulfate, titanium dioxide, zinc oxide, zinc sulfide, zinc carbonate, satin white, aluminum silicate, diatomite, calcium silicate, magnesium silicate, silica, amorphous silica, synthetic amorphous silica, colloidal silica, alumina, colloidal alumina, boehmite, pseudo-boehmite, aluminum hydroxide, aluminum, lithopone, zeolite, magnesium carbonate, magnesium hydroxide, magnesium, calcium, clay, calcium carbonate, polystyrene, polymethacrylates, polyacrylates, polyolefins, polyethylene, polypropylene, copolymers, and combinations thereof. In some other examples, the filler particles can include calcium carbonate. The calcium carbonate can be in the form of ground calcium carbonate, precipitated calcium carbonate, modified forms thereof, and combinations thereof. In another example, the filler particles can include calcium carbonate and clay.

In some examples, the primary coating composition (130) contains filler particles that have a nature of flame retardancy (or flame retardancy properties) or contains fillers and, separately, a flame retardant agent. The fillers that have a nature of flame retardancy or flame retardancy properties can be considered as flame retardant agents. As flame retardant agent, it is meant herein any substance that inhibits or reduces flammability or delays their combustion of the media containing it.

In some examples, the "fillers" can be solid particles in the room temperature having flame retardancy properties. In some other examples, the "fillers" also refers to the solid powder package that include a solid powder in the room temperature which has lower or limited flame retardancy properties in one example, or has no capability of flame retardancy properties in another example. In this case, the "filler package" or also called "filler", comprises a solid particle compounds and a flame retardant agent either in solid or liquid state in room temperature. The examples of fillers are, for example, but not limited to, an organohalogenated compound, a polymeric brominated compound, a metal oxide and phosphorus containing composition, a phosphorus and halogen containing composition, a phosphorus continuing composition, a nitrogen containing composition, a halogen, an organophosphate, or a combination thereof.

In one example, the fillers with flame retardancy properties can include a mineral compound. Exemplary mineral compounds can include aluminum hydroxide, magnesium hydroxide, huntite (magnesium calcium carbonate), hydromangesite (hydrated magnesium carbonate), phosphorus, red phosphorus, boehmite (aluminum oxide hydroxide), boron compounds, or combinations thereof. In another example, the flame retardant in filler package can include either a liquid or a solid flame retardant such as organohalogenated compound. Exemplary organohalogenated compounds can include organobromines, organochlorines, decabromodiphenyl ether, decabromodiphenyl ethane, and combinations thereof.

In yet another example, either the filler or the flame retardant can include a polymeric brominated compound. Exemplary polymeric brominated compounds can include brominated polystyrenes, brominated carbonate oligomers, brominated epoxy oligomers, tetrabro-mophthalic anhydride, tetrabromo-bisphenol A, hexabromocyclododecane, chlorendic acid, ethers of chlorendic acid, chlorinated paraffins, and combinations thereof. In yet another example, either the filler or flame retardant can include a metal and phosphorus containing composition. Example metal and phosphorus containing compositions can include aluminum diethylphosphinate, calcium diethylphosphinate, and combinations thereof. In a further example, either the filler or the flame retardant can include a phosphorus and a halogen containing composition. Exemplary phosphorus and halogen containing compositions can include tris(2,3-dibromopropyl) phosphate, chlorinated organophosphates, tris(1, 3-dichloro-2-propyl) phosphate, tetrekis(2-chloroethyl) dicloro-isopentyldiphosphate, tris (1,3-dichloroisopropyl) phosphate, tris(2-chloroisopropyl) phosphate, and combinations thereof.

In some example, either the filler or the flame retardant can include a phosphorus containing composition. Exemplary phosphorus containing compositions can include phosphates, phosphonates, phoshpinates, and combinations thereof. In some examples, the phosphorus containing composition can have different oxidations states. In one example, the phosphorus containing composition can be a closed ring structure such as FR-102® (available from Shanghai Xusen Non-Halogen Smoke Suppressing Fire Retardants Co. Ltd, China) and Aflammit® (available from Thor, Germany). In another example, the phosphorus containing composition can be a water soluble phosphorus containing compound. Exemplary water soluble phosphorus containing compositions can include, a phosphonate ester with one or two, closed 4 to 6 member phosphorus containing ring structures. In one example, the water soluble phosphorus containing composition can be 5-ethyl-2-methyl-1,3,2,-dioxaphosphoranian-5-yl)methyl dimethyl phosphonate P oxide. In another example, the water soluble phosphorus containing composition can be bis[(-ethyl-2-methyl-1,3,2-dioxaphosphorinan-5-yl)methyl] methyl phosphonate P,P'-dioxide. In another example, either the filler or the flame retardant can include a nitrogen containing composition. Exemplary nitrogen containing compositions can include melamines, melamine derivatives, melamine, melamine cyanurate, melamine polyphosphate, melem (heptazine derivative), melon (heptazine derivative), and combinations.

In some examples, either the filler or the flame retardant can be a combination of a phosphorus containing compound, a nitrogen containing compound, and/or a halogen. In one example, the flame retardant can include a phosphorus and a nitrogen containing composition. Exemplary phosphorus and nitrogen containing compositions can include ammonium polyphosphate (APP), poly 4,4-diaminodiphenyl methane spirocyclic pentaerythritol bisphosphonate (PD-SPB), 1,4-di(diethoxy thiophosphamide benzene (DTPAB), and combinations. In another example, either the filler or the flame retardant can include an organophosphate. The organophosphate can include aliphatic phosphate; aliphatic phosphonate; aromatic phosphonate; aliphatic organophosphate; aromatic organophosphate; polymeric organophosphate with 2 or 3 oxygen atoms attached to the central phosphorus and combinations.

In some examples, the flame retardant agents or the filler particles with flame retardancy properties are selected from the group consisting of phosphorus-containing compounds, nitrogen-containing compounds, organophosphate compounds, alumina trihydrate and calcium carbonate. In some other examples, the filler particles with flame retardancy properties are selected from the group consisting of phosphorus-containing compounds, nitrogen-containing compounds, organophosphate compounds, alumina trihydrate and calcium carbonate. In yet some other examples, the flame retardant agents or the filler particles with flame retardancy properties are selected from the group consisting of phosphorus-containing compounds and nitrogen-containing compounds. The flame retardant, either in solid state or in liquid state, can also be selected from the group consisting of phosphorus-containing compounds, nitrogen-containing compounds, organophosphate compounds, alumina trihydrate and calcium carbonate.

Examples of commercially available products, with flame retardancy properties and the flame retardant either in solid state or in liquid state include FR102® (available from Shanghai Xusen Co Ltd) or Aflammit® PE and Aflammit® MSG (both available from Thor), Exolit® AP compounds (available from Clariant), solid Aflammit® powder compounds (available from Thor), Disflamoll®DPK (available from Lanxess), Phoslite B compounds (available from Italmatch Chemicals), or SpaceRite® S-3 (J.M. Huber Corp).

In some examples, the filler or filler package or filler particles with flame retardancy properties or flame retardant agent is present, in the primary coating composition (130), in an amount representing from about 10 to about 90 wt % by total weigh of the primary coating composition. In some other examples, the filler or filler package or flame retardant agent is present, in the primary coating composition (130), in an amount representing from about 5 wt % to about 90 wt %, or from about 10 wt % to about 80 wt %, or from about 15 wt % to about 70 wt %, by total weigh of the primary coating composition.

The filler or the filler package can include a mineral powder, an organo-halogenated compound, a polymeric brominated compound, a metal and phosphorus containing composition, a phosphorus containing composition, a nitrogen containing composition, a halogen, an organophosphate, or combination thereof.

In some examples, in "filler package", the ratio of filler particles to flame retardant agent can vary from about 2 to about 35 by dry weight. In some other examples, the ratio of filler particles to flame retardant agent can range from 3 to about 20 by dry weight. In yet some other examples, the ratio of filler particles to flame retardant agent can range from about 5 to about 15. The size of the filler particles can also vary. In one example, the filler particles can have an average particle size ranging from about 0.1 µm to about 20 µm. In another example, the filler particles can have an average particle size ranging from about 0.2 µm to about 18 µm. In yet another example, the filler particles can have an average particle size ranging from about 0.5 µm to about 10 µm. In a further example, the filler particles can have an average particle size ranging from about 1 µm to about 5 µm. The filler particles can include from 5 wt % to about 95 wt % of the primary coating composition based on dry weight of the primary coating composition and can have an average particle size from 0.1 µm to 20 µm. The filler particles can be added to the primary coating composition in the form of a dry powder, dispersed in a slurry, or in the form of an aqueous suspension.

The Image-Receiving Layer (140)

The fabric print medium (100) of the present disclosure includes an image-receiving layer (140). The image-receiving layer (140), or inkjet receiving layer, will form a coating layer and is applied over the primary coating composition (130) on the fabric base substrate (110). In some examples, the image-receiving layer is applied to both side of the fabric base substrate (110) over the primary coating (130) when both side of the media are coated with the primary coating composition (130). The image-receiving layer would act as the image-receiving layer since, during the printing process, the ink will be directly deposited on its surface.

In some examples, the image-receiving coating composition is applied to the primary coating composition at a coat weight ranging from about 0.1 to about 40 gsm (gram per square meter) or at a coat weight ranging or from about 1 to 20 gsm (gram per square meter). In some other examples, the image-receiving coating composition is applied to the primary coating composition at a thickness ranging from about 1 µm to about 50 µm with a dry coat weight ranging from about 0.5 gsm to about 50 gsm.

In some examples, the image-receiving layer includes a first and a second crosslinked polymeric network. The wording "polymer network" refers herein to a polymer and/or a polymer mixture which can be self-cross-linked, by reaction of different function groups in the same molecular chain, or inter-cross-linked by reaction with another compound which has different function group. In some other examples, the image-receiving layer includes a first and a second polymeric network. In yet some other examples, the image-receiving layer includes a first and a second polymeric network that are crosslinked polymeric network. The first crosslinked polymeric network and the second crosslinked polymeric network can be either different or identical by their chemical natures.

The image-receiving layer (140) comprises a first crosslinked polymeric network and a second crosslinked polymeric network. In some examples, the image-receiving layer comprises a first crosslinked polymeric network, a second crosslinked polymeric network, and filler particles. The filler particles can be inorganic filler particles, organic particles, particles with or without flame retardancy nature, and flame retardants. The filler particles can be the same or different as the one used in the primary coating composition as described previously.

In some examples, the first crosslinked polymeric network can be crosslinked to itself. In another example, the first crosslinked polymeric network can be crosslinked to itself and to the second crosslinked polymeric network. In one example, the second crosslinked polymeric network can be crosslinked to itself. When the first crosslinked polymeric network and the second crosslinked polymeric network are not crosslinked to one another they can be entangled or appear layered onto one another.

The first and second crosslinked polymeric networks can be present in the secondary coating layer in a variety of amounts. The first and second crosslinked polymeric networks can collectively represent from about 80 wt % to about 99 wt % of the total weight of the image-receiving layer. In another example, the first and second crosslinked polymeric networks can collectively represent from about 85 wt % to about 95 wt % of the total weight of the image-receiving layer. In a further example, the first and second crosslinked polymeric networks can collectively range from about 85 wt % to about 93 wt % of the total weight of the image-receiving layer. In some examples, the first and second crosslinked polymeric networks can be present in equal amounts. In other examples, the first and second crosslinked polymeric networks can be present in different amounts.

In some examples, in the image-receiving coating composition, the first crosslinked polymeric network and the second crosslinked polymeric network are different and independently comprises polyacrylate, polyurethane, vinyl-urethane, acrylic urethane, polyurethane-acrylic, polyether polyurethane, polyester polyurethane, polycaprolactam polyurethane, polyether polyurethane, alkyl epoxy resin, epoxy novolac resin, polyglycidyl resin, polyoxirane resin, polyamine, styrene maleic anhydride, a derivative thereof, or a combination thereof. The first and/or the second crosslinked polymeric networks can include a polyacrylate, polyurethane, vinyl-urethane, acrylic urethane, polyurethane-acrylic, polyether polyurethane, polyester polyurethane, polycaprolactam polyurethane, polyether polyurethane, alkyl epoxy resin, epoxy novolac resin, polyglycidyl resin, polyoxirane resin, polyamine, styrene maleic anhydride, derivative thereof, or combination thereof. In some examples, the first and second crosslinked polymeric networks can be different polymers.

In one example, the first and/or the second crosslinked polymeric network can include a polyacrylate based polymer. Exemplary polyacrylate based polymers can include polymers made by hydrophobic addition monomers include, but are not limited to, $C_1$-$C_{12}$ alkyl acrylate and methacrylate (e.g., methyl acrylate, ethyl acrylate, n-propyl acrylate, isopropyl acrylate, n-butyl acrylate, isobutyl acrylate, sec-butyl acrylate, tert-butyl acrylate, 2-ethylhexyl acrylate, octyl arylate, methyl methacrylate, ethyl methacrylate, n-propyl methacrylate, isopropyl methacrylate, n-butyl methacrylate, isobutyl methacrylate, sec-butyl methacrylate, tert-butyl methacrylate), and aromatic monomers (e.g., styrene, phenyl methacrylate, o-tolyl methacrylate, m-tolyl methacrylate, p-tolyl methacrylate, benzyl methacrylate), hydroxyl containing monomers (e.g., hydroxyethylacrylate, hydroxyethylmthacrylate), carboxylic containing monomers (e.g., acrylic acid, methacrylic acid), vinyl ester monomers (e.g., vinyl acetate, vinyl propionate, vinylbenzoate, vinylpivalate, vinyl-2-ethylhexanoate, vinylversatate), vinyl benzene monomer, $C_1$-$C_{12}$ alkyl acrylamide and methacrylamide (e.g., t-butyl acrylamide, sec-butyl acrylamide, N,N-dimethylacrylamide), crosslinking monomers (e.g., divinyl benzene, ethyleneglycoldimethacrylate, bis(acryloylamido) methylene), and combinations thereof. Polymers made from the polymerization and/or copolymerization of alkyl acrylate, alkyl methacrylate, vinyl esters, and styrene derivatives may also be useful. In one example, the polyacrylate based polymer can include polymers having a glass transition temperature greater than 20° C. In another example, the polyacrylate based polymer can include polymers having a glass transition temperature of greater than 40° C. In yet another example, the polyacrylate based polymer can include polymers having a glass transition temperature of greater than 50° C.

In some examples, the first and/or the second crosslinked polymeric network can be formed by using self-cross linked polyurethane polymers or cross-linkable polyglycidyl or polyoxirane resins. In some other examples, the first and/or second crosslinked polymeric network can be formed by using self-cross linked polyurethane polymers. The self-cross linked polyurethane polymer can be formed by reacting an isocyanate with a polyol. Exemplary isocyanates used to form the polyurethane polymer can include toluenediisocyanate, 1,6-hexamethylenediisocyanate, diphenylmethane-diisocyanate, 1,3-bis(isocyanatemethyl)cyclohexane, 1,4-cyclohexyldiisocyanate, p-phenylenediisocyanate, 2,2,4(2, 4,4)-trimethylhexamethylenediisocyanate, 4,4'-dicyclohexylmethanediisocyanate, 3,3'-dimethyldiphenyl, 4,4'-diisocyanate, m-xylenediisocyanate, tetramethylxylenediisocyanate, 1,5-naphthalenediisocyanate, dimethyl-triphenyl-methane-tetra-isocyanate, triphenyl-methane-tri-isocyanate, tris(iso-cyanate-phenyl)thiophosphate, and combinations thereof. Commercially available isocyanates can include Rhodocoat® WT 2102 (available from Rhodia AG, Germany), Basonat® LR 8878 (available from BASF Corporation, N. America), Desmodur® DA, and Bayhydur® 3100 (Desmodur® and Bayhydur® are available from Bayer AG, Germany). In some examples, the isocyanate can be protected from water. Exemplary polyols can include 1,4-butanediol; 1,3-propanediol; 1,2-ethanediol; 1,2-propanediol; 1,6-hexanediol; 2-methyl-1,3-propanediol; 2,2-dimethyl-1,3-propanediol; neopentyl glycol; cyclo-hexanedimethanol; 1,2,3-propanetriol; 2-ethyl-2-hydroxymethyl-1,3-propanediol; and combinations thereof. In some examples, the isocyanate and the polyol can have less than three functional end groups per molecule. In another example, the isocyanate and the polyol can have less than five functional end groups per molecule. In yet another example, the polyurethane can be formed from a polyisocyanate having at least two isocyanate functionalities and a polyol having at least two hydroxyl or amine groups. Exemplary polyisocyanates can include diisocyanate monomers and oligomers. The self-cross linked polyurethane polymer can also formed by reacting an isocyanate with a polyol, where both isocyanates and polyols have average less than three end functional groups per molecule so that the polymeric network is based on a liner polymeric chain structure.

The polyurethane chain can have a trimethyloxysiloxane group and cross-link action can take place by hydrolysis of the function group to form silsesquioxane structure. The polyurethane chain can also have an acrylic function group, and the cross-link structure can be formed by nucleophilic addition to acrylate group through acetoacetoxy functionality. In some other examples, the first and/or second crosslinked polymeric network is formed by using vinyl-urethane hybrid copolymers or acrylic-urethane hybrid polymers. In yet some other examples, the polymeric network includes an aliphatic polyurethane-acrylic hybrid polymer. Representative commercially available examples of the chemicals which can form a polymeric network include, but are not limited to, NeoPac®R-9000, R-9699 and R-9030 (from Zeneca Resins), Sancure®AU4010 (from Lubrizol) and Hybridur®570 (from Air Products).

In one example, the weight average molecular weight of the polyurethane polymer used in the first and/or second crosslinked polymer can range from about 20,000 Mw to about 200,000 Mw as measured by gel permeation chromatography. In another example, the weight average molecular weight of the polyurethane polymer can range from about 40,000 Mw to about 180,000 Mw as measured by gel permeation chromatography. In yet another example, the weight average molecular weight of the polyurethane polymer can range from about 60,000 Mw to about 140,000 Mw as measured by gel permeation chromatography.

Exemplary polyurethane polymers can include polyester based polyurethanes, U910, U938 U2101 and U420; polyether based polyurethane, U205, U410, U500 and U400N; polycarbonate based polyurethanes, U930, U933, U915 and U911; castor oil based polyurethane, CUR21, CUR69, CUR99 and CUR991; and combinations thereof. (All of these polyurethanes are available from Alberdingk Boley Inc., North Carolina, USA).

The polymeric network (the first and/or second) can include a polymeric core that is, at least, one polyurethane. The polyurethanes include aliphatic as well as aromatic polyurethanes. The polyurethane is typically the reaction products of the following components: a polyisocyanate having at least two isocyanate (—NCO) functionalities per molecule with, at least, one isocyanate reactive group such as a polyol having at least two hydroxy groups or an amine. Suitable polyisocyanates include diisocyanate monomers, and oligomers. Examples of polyurethanes include aromatic polyether polyurethanes, aliphatic polyether polyurethanes, aromatic polyester polyurethanes, aliphatic polyester polyurethanes, aromatic polycaprolactam polyurethanes, and aliphatic polycaprolactam polyurethanes. In some other, the polyurethanes are aromatic polyether polyurethanes, aliphatic polyether polyurethanes, aromatic polyester polyurethanes, and aliphatic polyester polyurethanes. Representative commercially available examples of polyurethanes include Sancure®2710 and/or Avalure®UR445 (which are equivalent copolymers of polypropylene glycol, isophorone diisocyanate, and 2,2-dimethylolpropionic acid, having the International Nomenclature Cosmetic Ingredient name "PPG-17/PPG-34/IPDI/DMPA Copolymer"), Sancure®878, Sancure®815, Sancure®1301, Sancure®2715, Sancure®2026, Sancure®1818, Sancure®853, Sancure®830, Sancure®825, Sancure®776, Sancure®850, Sancure®12140, Sancure®12619, Sancure®835, Sancure®843, Sancure®898, Sancure®899, Sancure®1511, Sancure®1514, Sancure®1517®, Sancure®1591, Sancure®2255, Sancure®2260, Sancure®2310, Sancure®2725, and Sancure®2016 (all commercially available from Lubrizol Inc.).

Other examples of commercially-available polyurethanes can include NeoPac® R-9000, R-9699, and R-9030 (available from Zeneca Resins, Ohio), Printrite® DP376 and Sancure® AU4010 (available from Lubrizol Advanced Materials, Inc., Ohio), and Hybridur® 570 (available from Air Products and Chemicals Inc., Pennsylvania).

In some example, the polymeric network is created by using cross-linkable polyglycidyl or polyoxirane resins. Cross-link reaction can take place either with themselves (through catalytic homopolymerisation of oxirane function group) or with the help of a wide range of co-reactants including polyfunctional amines, acids, acid anhydrides, phenols, alcohols, and thiols. Both polyglycidyl resin and co-reactants are compatible with the chemicals that form a polymeric network before curing in liquid state. The term "compatible" refers here to the fact that there is no significant phase separation after mixing in the room temperature.

In some examples, the first and/or the second polymeric network comprises epoxy-functional additives. Epoxy-functional additives can include alkyl and aromatic epoxy resins or epoxy-functional resins, such as for example, epoxy novolac resin(s) and other epoxy resin derivatives. Epoxy-functional molecules can include at least one, or two or more pendant epoxy moieties. The molecules can be aliphatic or aromatic, linear, branched, cyclic or acyclic. If cyclic structures are present, they may be linked to other cyclic structures by single bonds, linking moieties, bridge structures, pyro moieties, and the like. Examples of suitable epoxy functional resins are commercially available and include, without limitation, Ancarez®AR555 (commercially available from Air Products), Ancarez®AR550, Epi-rez®3510W60, Epi-rez®3515W6, or Epi-rez®3522W60 (commercially available from Hexion).

In some other examples, the polymeric network includes epoxy resin. Examples of suitable aqueous dispersions of epoxy resin include Waterpoxy®1422 (commercially available from Cognis) or Ancarez®AR555 1422 (commercially available from Air Products). The polymeric network can comprise epoxy resin hardeners. The examples of epoxy resin hardeners that can be used herein include liquid aliphatic or cycloaliphatic amine hardeners of various molecular weights, in 100% solids or in emulsion or water and solvent solution forms. Amine adducts with alcohols and phenols or emulsifiers can also be envisioned. Examples of suitable commercially available hardeners include Anquawhite®100 (from Air Products) and EPI-CURE® 8290-Y-60 (from Hexion). The polymeric network can include water-based polyamine as epoxy resin hardeners. Such epoxy resin hardeners can be, for examples, water-based polyfunctional amines, acids, acid anhydrides, phenols, alcohols and/or thiols. Other examples of commercially available polymeric networks that can be used herein includes the ingredients Araldite® PZ 3921 and/or Aradur® 3985 available from Huntsman.

In some examples, the image-receiving layer includes a first and/or second polymeric network that is a hybrid network created by using self-cross linked polyurethane polymers and by using cross-linkable polyglycidyl or polyoxirane resins. In some other examples, the image-receiving layer comprises a polymeric network that is created by using vinyl-urethane hybrid copolymers or acrylic-urethane hybrid polymers and water-based epoxy resins and water-based polyamines. In a further example, the first and/or second crosslinked polymeric network can include a styrene maleic anhydride (SMA). In one example, the SMA can include NovaCote 2000® (Georgia-Pacific Chemicals LLC, Georgia). In another example, the styrene maleic anhydride can be combined with an amine terminated polyethylene oxide (PEO); amine terminated polypropylene oxide (PPO), copolymer thereof, or a combination thereof. In one example, combining a styrene maleic anhydride with an amine terminated PEO and/or PPO can strengthen the polymeric network by crosslinking the acid carboxylate functionalities of the SMA to the amine moieties on the amine terminated PEO and/or PPO. The amine terminated PEO and/or PPO, in one example, can include amine moieties at one or both ends of the PEO and/or PPO chain, and/or as branched side chains on the PEO and/or PPO. In one example, utilizing an amine terminated PEO and/or PPO in combination with a SMA can allow for the user to retain the glossy features of the SMA while eliminating the brittle nature of SMA. Exemplary commercially available amine terminated PEO and/or PPO compounds can include Jeffamine® XTJ-500, Jeffamine® XTJ-502, and Jeffamine® XTJ D-2000 (all available from Huntsman International LLC, Texas). In some examples, a weight ratio of SMA to the amine terminated PEO and/or PPO can range from about 100:1 to about 2.5:1. In another, a weight ratio of the SMA to the amine terminated PEO and/or PPO can range from about 90:1 to about 10:1. In yet another example, a weight ratio of the SMA to the amine terminated PEO and/or PPO can range from about 75:1 to about 25:1.

In some examples, the image-receiving layer might further comprises filler particles. Such filler includes inorganic compounds, organic compounds, compounds with flame retardancy nature, and flame retardant agents. The filler particles can be the same or different as the one used in the primary coating composition as described previously.

In some examples, the filler compounds have an average particle size in the range of about 0.05 to about 25 micrometers ($\mu m$, $10^{-6}$ m). In some other examples, the inorganic compounds have an average particle size in the range of about 0.1 to about 10 micrometers ($\mu m$). The amount of filler compound, in the image-receiving layer, can be within the range of about 5 to about 70 wt % or within the range of about 10 to about 60 wt % or within the range of about 15 to about 50 wt % by total weight of the image-receiving layer. Examples of the fillers include but not limited to, calcium carbonate, zeolite, silica, talc, alumina, aluminum trihydrate (ATH), calcium silicate, kaolin, calcined clay, and combination or mixtures of any of these. Examples of commercial available compound, also includes, but are not limited to, ground calcium carbonate such as Hydrocarb® 60 available from Omya, Inc.; precipitated calcium carbonate such as Opacarb®A40 or Opacarb®3000 available from Specialty Minerals Inc. (SMI); clay such as Miragloss® available from Engelhard Corporation; synthetic clay such as hydrous sodium lithium magnesium silicate, such as, for example, Laponite® available from Southern Clay Products Inc., and titanium dioxide ($TiO_2$) available from, for example, Sigma-Aldrich Co. Examples of fillers include, but are not limited to, compound, either existing in a dispersed slurry or in a solid powder, of polystyrene and its copolymers, polymethyacrylates and their copolymers, polyacrylates and their copolymers, polyolefins and their copolymers, such as polyethylene and polypropylene, a combination of two or more of the polymers. The filler compound may be chosen from silica gel (e.g., Silojet®703C available from Grace Co.), modified (e.g., surface modified, chemically modified, etc.) calcium carbonate (e.g., Omyajet®B6606, C3301, and 5010, all of which are available from Omya, Inc.), precipitated calcium carbonate (e.g., Jetcoat®30 available from Specialty Minerals, Inc.), and combinations thereof.

In addition to the above-described components, the image-receiving layer might contain other components or additives. The additives include, but are not limited to, one or more of rheology modifiers, thickening agents, cross-linking agents, surfactants, defoamers, optical brighteners, dyes, pH controlling agents or wetting agents, and dispersing agents, for example. The total amount of additives, in the composition for forming the treatment composition, can be from about 0.1 wt % to about 10 wt % or from about 0.2 wt % to about 5 wt %, by total dry weight of the treatment composition.

Method for Forming a Fabric Print Medium

In some examples, the method for forming the fabric print medium encompasses providing a fabric base substrate; applying a barrier layer comprising a water-repellent agent and a physical gelling compound applied to, at least, one side of the fabric base substrate; applying a primary coating composition, including a polymeric binder and filler particles, over the barrier layer; and applying an image-receiving coating composition including a first and a second crosslinked polymeric network, over the primary coating composition. The barrier layer (120) can comprise a water-repellent agent that is latex polymer having a glass transition temperature (Tg) that is less than 0° C.

In some examples, the barrier layers (120) are applied to both sides of the fabric base substrate (110), the primary coating compositions (130) are applied over both barrier layers and the image-receiving coating compositions (140) are also applied over both primary coating compositions in order to produce a fabric print medium that could be printed on both sides.

In some examples, a fabric print medium with one printing side is presented. In some other examples, a fabric print medium with two printing sides is presented. The primary coating compositions can independently include a polymeric binder and filler particles. The secondary coating layers can be applied to the primary coating composition on both the first side and the second side at an independent thickness from 1 μm to 50 μm with an independent dry coat weight ranging from 0.5 gsm to 50 gsm. The secondary coating layers can independently include a first crosslinked polymeric network and a second crosslinked polymeric network. The primary coating compositions can be two or more times thicker than their respective immediately adjacent secondary coating layer. The term "independently" is used in this example to indicate that though both sides have the same general parameters, the respective layers on each side does not need to be identical. The primary coating composition can include a polymeric binder and filler particles and the composition used to form the layer can have a viscosity ranging from about 5,000 cps to about 30,000 cps, e.g., the viscosity of the composition is measured at room temperature at a speed of 100 rpm by a Brookfield viscometer.

The application of the barrier layer, the primary coating composition (primer layer composition) and the image-receiving coating composition (secondary coating layer) can include a floating knife process, a knife on roll mechanism process, or a transfer coating process. The floating knife process can include stretching the fabric to form an even uniform surface. The floating knife process can further include transporting the fabric under a stationary knife blade. In some examples, the step of applying the primary and secondary coating layer can include applying a foam coating. The foam coating can be applied using a knife-on-the roll mechanism. The knife-on-the roll mechanism can be followed by passing the fabric through calendaring pressure nips. The calendaring can be done either in room temperature or at an elevated temperature and/or pressure. The elevated temperature can range from 40° C. to 100° C. The elevated pressure can range from about 100 psi to about 5,000 psi. In some other examples, the coating process can include transferring the coating composition. When the coating composition is transferred, the coating can be spread onto a release substrate to form a film. The film can then be laminated onto the fabric.

Coating compositions can be dried using box hot air dryer. The dryer can be a single unit or could be in a serial of 3 to 7 units so that a temperature profile can be created with initial lower temperature (to remove excessive water) and mild temperature in end units (to ensure completely drying with a final moisture level of less than 1-5% for example). The peak dryer temperature can be programmed into a profile with lower to moderate temperature at begging of the drying when wet moisture is high and then go through peak temperature range to ensure the coating is dried and cross-linked if required. At the end of profile, the web temperature is reduced to lower temperature when web becoming dry. The dryer temperature is controlled to a temperature of less than about 200° C. peak temperature to avoid yelling textile, and the fabric web temperature is controlled in the range of about 90 to about 180° C. In some examples, the operation speed of the coating/drying line is 20 meters per minute. In some examples, the method can further include applying pressure using pressure nips equipped on the coater meaning calendaring the web with the same speed as coating, or off-line calendar to the fabric media after applying the primary and top coating layer, with the same or different calendaring speed.

Printing Method

Once the coating composition is applied to the fabric base substrate and appropriately dried, ink compositions can be applied by any processes onto the fabric print medium. In some examples, the ink composition is applied to the fabric print medium via inkjet printing techniques. The printing method (300) encompasses obtaining a fabric print medium containing a fabric base substrate; a barrier layer comprising a water-repellent agent and a physical gelling compound; a primary coating composition including a polymeric binder and filler particles and an image-receiving coating composition including a first and a second crosslinked polymeric network applied over the primary coating composition (310); and, then, applying an ink composition onto said fabric print medium to form a printed image (320). Said printed image will have, for instance, enhanced image quality and image permanence. In some examples, when needed, the printed image can be dried using any drying device attached to a printer such as, for instance, an IR heater.

In some examples, the ink composition is an inkjet ink composition that contains one or more colorants that impart the desired color to the printed message and a liquid vehicle. As used herein, "colorant" includes dyes, pigments, and/or other particulates that may be suspended or dissolved in an ink vehicle. The colorant can be present in the ink composition in an amount required to produce the desired contrast and readability. In some examples, the ink compositions include pigments as colorants. Pigments that can be used include self-dispersed pigments and non-self-dispersed pigments. Any pigment can be used; suitable pigments include black pigments, white pigments, cyan pigments, magenta pigments, yellow pigments, or the like. Pigments can be organic or inorganic particles as well known in the art. As used herein, "liquid vehicle" is defined to include any liquid composition that is used to carry colorants, including pigments, to a substrate. A wide variety of liquid vehicle components may be used and include, as examples, water or any kind of solvents.

In some other examples, the ink composition, applied to the fabric print medium, is an ink composition containing latex components. Latex components are, for examples, polymeric latex particulates. The ink composition may contain polymeric latex particulates in an amount representing from about 0.5 wt % to about 15 wt % based on the total weight of the ink composition. The polymeric latex refers herein to a stable dispersion of polymeric micro-particles dispersed in the aqueous vehicle of the ink. The polymeric latex can be natural latex or synthetic latex. Synthetic latexes are usually produced by emulsion polymerization using a variety of initiators, surfactants and monomers. In various examples, the polymeric latex can be cationic, anionic, nonionic, or amphoteric polymeric latex. Monomers that are often used to make synthetic latexes include ethyl acrylate; ethyl methacrylate; benzyl acrylate; benzyl methacrylate; propyl acrylate; methyl methacrylate, propyl methacrylate; iso-propyl acrylate; iso-propyl methacrylate; butyl acrylate; butyl methacrylate; hexyl acrylate; hexyl methacrylate; octadecyl methacrylate; octadecyl acrylate; lauryl methacrylate; lauryl acrylate; hydroxyethyl acrylate; hydroxyethyl methacrylate; hydroxyhexyl acrylate; hydroxyhexyl methacrylate; hydroxyoctadecyl acrylate; hydroxyoctadecyl methacrylate; hydroxylauryl methacrylate; hydroxylauryl acrylate; phenethyl acrylate; phenethyl methacrylate; 6-phenylhexyl acrylate; 6-phenylhexyl methacrylate; phenyllauryl acrylate; phenyllauryl methacrylate; 3-nitrophenyl-6-hexyl methacrylate; 3-nitrophenyl-18-octadecyl acrylate; ethyleneglycol dicyclopentyl ether acrylate; vinyl ethyl ketone; vinyl propyl ketone; vinyl hexyl ketone; vinyl octyl ketone; vinyl butyl ketone; cyclohexyl acrylate; methoxysilane; acryloxypropyhiethyldimethoxysilane; trifluoroethyl styrene; trifluoromethyl acrylate; trifluoromethyl methacrylate; tetrafluoropropyl acrylate; tetrafluoropropyl methacrylate; heptafluorobutyl methacrylate; butyl acrylate; iso-butyl methacrylate; 2-ethylhexyl acrylate; 2-ethylhexyl methacrylate; isooctyl acrylate; and iso-octyl methacrylate.

In some examples, the latexes are prepared by latex emulsion polymerization and have an average molecular weight ranging from about 10,000 Mw to about 5,000,000 Mw. The polymeric latex can be selected from the group consisting of acrylic polymers or copolymers, vinyl acetate polymers or copolymers, polyester polymers or copolymers, vinylidene chloride polymers or copolymers, butadiene polymers or copolymers, polystyrene polymers or copolymers, styrene-butadiene polymers or copolymers and acrylonitrile-butadiene polymers or copolymers. The latex components are on the form of a polymeric latex liquid suspension. Such polymeric latex liquid suspension can contain a liquid (such as water and/or other liquids) and polymeric latex particulates having a size ranging from about 20 nm to about 500 nm or ranging from about 100 nm to about 300 nm.

EXAMPLES

The raw materials and chemical components used in the illustrating samples are listed in Table 1.

TABLE 1

| Ingredients | Nature of the ingredients | Supplier |
|---|---|---|
| Araldite ® PZ 3901 | Cross-linked polymeric network | Hundtsman Inc. |
| Aradur ® 3985 | Cross-linked polymeric network | Hundtsman Inc. |
| SpaceRite ® S3 | Aluminum tri-hydroxide (filler & flame retardant agent) | J. M. Huber Corp. |
| Byk-Dynwet ® 800 | silicone-free wetting agent | BYK Inc. |
| BYK ® 024 | VOC-free silicone defoamer | BYK Inc. |
| Tegowet ® 510 | Surfactant | Evonik Industries |
| Hycar ®26349 | Polymeric binder | Lubrizol Inc. |
| Sancure ®2026 | Polyurethane polymer | Lubrizol Inc. |
| Sancure ®AU4010 | Self-Crosslinking aliphatic polyurethane-acrylic network | Lubrizol Inc. |
| Edolan ® AB | Polymeric binder | Tanatex Chemicals |
| Foamaster ® MO2185 | De-former | BASF Co. |
| Roven ® 4040 | Polymeric binder- water-repellent agent | Mallard Creek Polymers |
| Texipol ® 63-511 | physical gelling compound | |

Example 1

Preparation of Printable Medium Samples

The illustrating sample 1 is fabric print medium in accordance with the principles described herein. Samples 2, 3 and 4 are comparative examples. Detailed structures of these samples are shown in Table 2. Each samples have a support base structure (110) which is a 100% woven polyester fabric having a weight of 112 gsm and thickness of 175 micrometers (μm), a barrier layer (120), a primary coating composition (130) and an image-receiving coating layer (140). The different formulations of the barrier layer (120), primary coating composition (130) and image-receiving coating layer (140) are illustrated in the tables 3 and 4.

TABLE 2

| Samples | Barrier layer (120) | Primary coating composition PC (130) | Image-receiving layer IRC (140) |
|---|---|---|---|
| Sample 1 | B1 formulation applied on top of the fabric base, same side of PC/IRC 2 gsm | PC formulation applied on top of B1 20 gsm | IRC formulation applied on top of PC, 5 gsm |
| Sample 2 Comparative | B2 formulation applied on top of the fabric base, same side of PC/IRC 2 gsm | PC formulation applied on top of B1 20 gsm | IRC formulation applied on top of PC, 5 gsm |
| Sample 3 Comparative | B3 formulation applied on top of the fabric base, same side of PC/IRC 2 gsm | PC formulation applied on top of B1, 20 gsm | IRC formulation applied on top of PC, 5 gsm |
| Sample 4 Comparative | None | PC formulation applied on top of the fabric base, 20 gsm | IRC formulation applied on top of PC, 5 gsm |

TABLE 3

Barrier layer (120)

| Ingredient | B1 | B2 | B3 |
|---|---|---|---|
| Roven ®4040 (Tg = −8° C.) | 12% water solution | 12% water solution | — |
| Hycar ® 26349 (Tg = 15° C.) | — | — | 12% water solution |
| Texipol ® 63-511 | 1% | — | 1% |

TABLE 4

| Ingredient | Amount (Parts by dry weight) |
|---|---|
| Primary Coating (130) - PC | |
| Edolan ®AB | 40 |
| Spacerite ® S3 | 100 |
| Tegowet ® 510 | 1 |
| Foamaster MO2185 | 0.5 |
| Image-receiving coating (140) - IRC | |
| Byk-Dynwet ® 800 | 1 |
| BYK ® 024 | 0.5 |
| Araldite ® PZ 3901 | 10 |
| Aradur ® 3985 | 10 |
| Sancure ® 2016 | 5.8 |
| Sancure ® 4010 | 3.5 |

A 2.4 m width production knife on air fabric coater are used to produce the fabric print medium samples 1 to 4. During processing, the coating compositions (fluids) are applied directly to the textile fabric and spread in a uniform manner by means of a fixed knife. The thickness of the coatings, or coat-weight, is controlled by the gap between the bottom of the knife and the top of the fabric. A 2 mm flat tip blade (knife) is use for the barrier coating and the image-receiving coating, while the primary coating is accomplished by use a 3 mm U-type blade. The depth of blade is 1 cm. The coating speed for the barrier layer is in the range of 30 to 40 m/min while primary and image-receiving coating are applied under a speed of 20 m/min. After the coating compositions are applied on the fabric web, the web is gone through a 40 m long hot air dryer with multiple (8) controlled units so that a drying temperature profile can be set (For example, one of the setting coating is 110° C., 120° C., 130° C., 130° C., 130° C., 130° C., 115° C. and 90° C.). A on-line pressure nip is also closed to the primary and image-receiving coatings to further smooth-out the surface.

Example 2

Samples Performances

The same images are printed on the experimental Sample 1 and Comparison Samples 2, 3 and 4 using a HP® DesignJet L360 Printer equipped with HP 789 ink cartridge (HP Inc.). The printer is set with a heating zone temperature at about 50° C., a cure zone temperature at about 110° C., and an air flow at about 15%. The printed fabric medium are evaluated for different performances: image quality, image durability and soft feeling.

Image quality is evaluated using both numeric measurement method and visual evaluation method. Image quality tests are conducted by measuring the color gamut, using XYZ color patches on Macbeth® TD904 device (Micro Precision Test Equipment, California). The image quality of the prints related to bleed sharpness, blur, noise/graininess, banding, mottle, patchiness, line quality, and text quality, are evaluated visually from the printed samples using a scale of 1 to 5 (with 1 being the worst and 5 being the best).

The image durability test is performed by exposing the various samples to be tested to a 45 degree coin scratching under a normal force of 800 g. The test is done in a BYK Abrasion Tester (from BYK-Gardner USA, Columbus, Md.) with a linear, back-and-forth action, attempting to scratch off the image side of the samples (5 cycles). The image durability is evaluated visually from the printed samples using a scale of 1-5 (with 1 being the worst and 5 being the best).

The softness is evaluated "manually", by multiple operators (n=5) by initial hand feeling. An average score of 1 was given when resenting stiff and serious wrinkling, and a score of 5 was given if the when resenting soft and insignificant wrinkling.

The results of these tests are expressed in the Table 5 below.

TABLE 5

| Test Results | Image Quality | Image Durability | Soft feeling |
|---|---|---|---|
| Sample 1 | 5 | 4 | 5 |
| Sample 2 Comparative | 3 | 5 | 2 |
| Sample 3 Comparative | 5 | 5 | 1 |
| Sample 4 Comparative | 1 | 4 | 1 |

The coating quality and the results obtained during the coating process are observed and are shown in the Table 6 below.

TABLE 6

| | Results Observed during Coating |
|---|---|
| Sample 1 | Smooth run, no significant de-watering over 0.45-1 hours continuous machine running. Base coating quality score 4, and top coating quality score 5 |
| Sample 2 Comparative | A lot of resin contamination over all moving parts. Had to stop machine after 5 min. run to clean |
| Sample 3 Comparative | Smooth run, no significant de-watering over 0.45-1 hours. continuous machine running. Base coating quality score 4, and top coating quality score 5 |

TABLE 6-continued

Results Observed during Coating

| | |
|---|---|
| Sample 4 Comparative | A lot of "yogurt" like gelling produced during top coating after 5 min machine running. Machine forced to stop. Base coating quality score 2 |

As can be seen by the test results above, the fabric print medium according to the present disclosure provides several advantages over the comparative samples in terms of image quality, image durability and "soft hands" performances as well as easy of the coating process. It is noted that though some comparative medium performed well in some categories, they performed poorly in others. In accordance with examples of the present disclosure, over all of these tests, performance is collectively better when using the fabric print medium described herein.

The invention claimed is:

1. A fabric print medium comprising:
   a. a fabric base substrate;
   b. a barrier layer comprising a water-repellent agent and a physical gelling compound applied to, at least, one side of the fabric base substrate, wherein the barrier layer is applied to the fabric base substrate at a dry coat weight ranging from about 0.5 gsm per side to about 10 gsm per side;
   c. a primary coating composition including a polymeric binder and filler particles, applied over the barrier layer;
   d. and an image-receiving coating composition including a first and a second crosslinked polymeric network applied over the primary coating composition.

2. The fabric print medium of claim 1 wherein, in the barrier layer, the water-repellent agent is a film-forming polymer latex having a glass transition temperature (Tg) that is less than 0° C.

3. The fabric print medium of claim 1 wherein, in the barrier layer, the water-repellent agent is an acrylic polymer or copolymer, a vinyl acetate polymer or copolymer, a polyester polymer or copolymer, a vinylidene chloride polymer or copolymer, a butadiene polymer or copolymer, a styrene-butadiene polymer or copolymer, an acrylonitrile-butadiene polymers or copolymers.

4. The fabric print medium of claim 1 wherein, in the barrier layer, the physical gelling compound is a polymer having a molecular weight ranging from about 300,000 to about 1,000,000.

5. The fabric print medium of claim 1 wherein, in the barrier layer, the physical gelling compound is selected form the group consisting of copolymers of acrylates, copolymers with acrylate based polyelectrolyte backbone, copolymers with polyester backbone, and copolymers with polyurethane based copolymer backbone.

6. The fabric print medium of claim 1 wherein the primary coating composition comprises flame retardant agents or filler particles with flame retardancy properties that are selected from the group consisting of phosphorus-containing compounds, nitrogen-containing compounds, organophosphate compounds, alumina trihydrate and calcium carbonate.

7. The fabric print medium of claim 1 wherein, in the primary coating composition, the polymeric binder has a glass transition temperature (Tg) that is less than 5° C.

8. The fabric print medium of claim 1 wherein, in the primary coating composition, the polymeric binder is a polymer or a copolymer selected from the group consisting of acrylic polymers or copolymers, vinyl acetate polymers or copolymers, polyester polymers or copolymers, vinylidene chloride polymers or copolymers, butadiene polymers or copolymers, styrene-butadiene polymers or copolymers and acrylonitrile-butadiene polymers or copolymers.

9. The fabric print medium of claim 1 wherein the primary coating composition is applied over the over the barrier layer at a dry coat weight ranging from about 5 gsm to about 200 gsm per side.

10. The fabric print medium of claim 1 wherein, in the image-receiving coating composition, the first crosslinked polymeric network and the second crosslinked polymeric network are different and independently comprises polyacrylate, polyurethane, vinyl-urethane, acrylic urethane, polyurethane-acrylic, polyether polyurethane, polyester polyurethane, polycaprolactam polyurethane, polyether polyurethane, alkyl epoxy resin, epoxy novolac resin, polyglycidyl resin, polyoxirane resin, polyamine, styrene maleic anhydride, a derivative thereof, or a combination thereof.

11. The fabric print medium of claim 1 wherein the image-receiving layer is applied, over the primary coating composition, at a dry coat weight ranging from about 0.5 gsm to about 50 gsm per side.

12. A printable recording medium comprising a fabric base substrate, a barrier layer comprising a film-forming polymer latex having a glass transition temperature (Tg) that is less than 0° C. and a physical gelling compound applied to at least one side of the fabric base substrate at a dry coat weight ranging from about 0.5 gsm per side to about 10 gsm per side, a primary coating composition including a polymeric binder and filler particles applied over the barrier layer and an image-receiving coating composition.

13. A fabric print medium comprising:
   a. a fabric base substrate;
   b. a barrier layer comprising a water-repellent agent and a physical gelling compound applied to, at least, one side of the fabric base substrate;
   c. a primary coating composition including a polymeric binder and filler particles, applied over the barrier layer, wherein the polymeric binder has a glass transition temperature (Tg) that is less than 5° C.;
   d. and an image-receiving, coating composition including a first and a second crosslinked polymeric network applied over the primary coating composition.

14. The fabric print medium of claim 13 wherein, in the barrier layer, the water-repellent agent is a film-forming polymer latex having a glass transition temperature (Tg) that is less than 0° C.

15. The fabric print medium of claim 13 wherein, in the barrier layer, the water-repellent agent is an acrylic polymer or copolymer, a vinyl acetate polymer or copolymer, a polyester polymer or copolymer, a vinylidene chloride polymer or copolymer, a butadiene polymer or copolymer, a styrene-butadiene polymer or copolymer, an acrylonitrile-butadiene polymers or copolymers.

16. The fabric print medium of claim 13 wherein, in the barrier layer, the physical gelling compound is a polymer having a molecular weight ranging from about 300,000 to about 1,000,000.

17. The fabric print medium of claim 13 wherein, in the barrier layer, the physical gelling compound is selected form the group consisting of copolymers of acrylates, copolymers with acrylate based polyelectrolyte backbone, copolymers with polyester backbone, and copolymers with polyurethane based copolymer backbone.

18. The fabric print medium of claim 13 wherein the primary coating composition comprises flame retardant agents or filler particles with flame retardancy properties that are selected from the group consisting of phosphorus-containing compounds, nitrogen-containing compounds, organophosphate compounds, alumina trihydrate and calcium carbonate.

19. The fabric print medium of claim 13 wherein, in the primary coating composition, the polymeric binder is a polymer or a copolymer selected from the group consisting of acrylic polymers or copolymers, vinyl acetate polymers or copolymers, polyester polymers or copolymers, vinylidene chloride polymers or copolymers, butadiene polymers or copolymers, styrene-butadiene polymers or copolymers and acrylonitrile-butadiene polymers or copolymers.

20. The fabric print medium of claim 13 wherein the primary coating composition is applied over the over the barrier layer at a dry coat weight ranging from about 5 gsm to about 200 gsm per side.

21. The fabric print medium of claim 13 wherein, in the image-receiving coating composition, the first crosslinked polymeric network and the second crosslinked polymeric network are different and independently comprises polyacrylate, polyurethane, vinyl-urethane, acrylic urethane, polyurethane-acrylic, polyether polyurethane, polyester polyurethane, polycaprolactam polyurethane, polyether polyurethane, alkyl epoxy resin, epoxy novolac resin, polyglycidyl resin, polyoxirane resin, polyamine, styrene maleic anhydride, a derivative thereof, or a combination thereof.

22. The fabric print medium of claim 13 wherein the image-receiving layer is applied, over the primary coating composition, at a dry coat weight ranging from about 0.5 gsm to about 50 gsm per side.

* * * * *